(12) United States Patent
Roesser et al.

(10) Patent No.: US 8,195,456 B2
(45) Date of Patent: Jun. 5, 2012

(54) ROBUST SPEECH RECOGNITION BASED ON SPELLING WITH PHONETIC LETTER FAMILIES

(75) Inventors: Robert P. Roesser, Southfield, MI (US); Sarmad Y. Hermiz, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 12/631,699

(22) Filed: Dec. 4, 2009

(65) Prior Publication Data

US 2011/0137638 A1 Jun. 9, 2011

(51) Int. Cl.
G10L 15/00 (2006.01)
G10L 15/08 (2006.01)

(52) U.S. Cl. ............ 704/231; 704/254; 379/88.03; 701/539

(58) Field of Classification Search .......... 704/231, 704/236, 251, 252, 254, 255, 275; 379/88.01, 379/88.03; 701/538, 539
See application file for complete search history.

(56) References Cited

U.S. PATENT DOCUMENTS

| | | | |
|---|---|---|---|
| 5,054,074 A | 10/1991 | Bakis | |
| 5,208,863 A | 5/1993 | Sakurai et al. | |
| 5,452,397 A | 9/1995 | Ittycheriah et al. | |
| 5,995,928 A * | 11/1999 | Nguyen et al. | 704/251 |
| 6,032,164 A | 2/2000 | Tsai | |
| 6,182,039 B1 | 1/2001 | Rigazio et al. | |
| 6,405,123 B1 * | 6/2002 | Rennard et al. | 701/410 |
| 6,411,893 B2 * | 6/2002 | Ruhl | 701/539 |
| 6,421,672 B1 * | 7/2002 | McAllister et al. | 704/251 |
| 6,694,296 B1 * | 2/2004 | Alleva et al. | 704/255 |
| 6,725,197 B1 | 4/2004 | Wuppermann et al. | |
| 7,006,971 B1 * | 2/2006 | Stahl et al. | 704/242 |
| 7,177,817 B1 * | 2/2007 | Khosla et al. | 704/275 |
| 7,243,069 B2 | 7/2007 | Jaepel et al. | |
| 7,269,563 B2 * | 9/2007 | Douros | 704/275 |
| 7,412,386 B2 * | 8/2008 | Janke et al. | 704/254 |
| 2001/0056345 A1 | 12/2001 | Guedalia | |
| 2002/0016669 A1 * | 2/2002 | Ruhl | 701/207 |
| 2004/0230435 A1 * | 11/2004 | Douros | 704/275 |
| 2004/0240633 A1 * | 12/2004 | Sloan | 379/88.16 |
| 2005/0080632 A1 * | 4/2005 | Endo et al. | 704/277 |
| 2006/0015336 A1 * | 1/2006 | Parthasarathy | 704/235 |
| 2006/0173680 A1 * | 8/2006 | Verhasselt et al. | 704/235 |
| 2006/0229870 A1 | 10/2006 | Kobal | |
| 2007/0016420 A1 * | 1/2007 | Azulai et al. | 704/254 |
| 2007/0094021 A1 | 4/2007 | Bossemeyer, Jr. et al. | |
| 2007/0198171 A1 * | 8/2007 | Steins et al. | 701/200 |
| 2007/0230456 A1 * | 10/2007 | Kwon et al. | 370/389 |
| 2008/0091412 A1 * | 4/2008 | Strope et al. | 704/10 |
| 2008/0267364 A1 * | 10/2008 | Janke et al. | 379/88.03 |
| 2009/0182729 A1 * | 7/2009 | Lu et al. | 707/5 |
| 2010/0094630 A1 * | 4/2010 | Yoakum | 704/254 |
| 2010/0100310 A1 * | 4/2010 | Eich et al. | 701/201 |

* cited by examiner

*Primary Examiner* — Martin Lerner
(74) *Attorney, Agent, or Firm* — John A. Miller; Miller IP Group, PLC

(57) ABSTRACT

A system and method for entering a destination into a navigation system, usually a vehicle navigation system, that uses phonetic letter families, or groups of letters which sound similar, to improve the reliability and accuracy of speech recognition. The method involves grouping each letter of the English alphabet into a family of letters which sound similar, such as A, J, and K. When a destination name is spelled by a user, each letter is recognized in terms of the phonetic letter family to which it belongs. This phonetic equivalent spelling is compared to the navigation database of street, city, and state names, which has also been converted to its phonetic equivalent spelling. If a match is found, the user is asked to confirm that this is the desired destination.

16 Claims, 1 Drawing Sheet

ROBUST SPEECH RECOGNITION BASED ON SPELLING WITH PHONETIC LETTER FAMILIES

BACKGROUND OF THE INVENTION

1. Field of the Invention

This invention relates generally to the field of navigation systems and, more particularly, to a method and system for improving the reliability of speech recognition in a vehicle navigation system that uses the concept of phonetic letter families, or groups of similar sounding letters, to improve the accuracy and reliability of machine recognition of spoken addresses for entry of destinations into the navigation system.

2. Discussion of the Related Art

Modern vehicles frequently include onboard navigation systems as a driver safety and convenience feature. The methods by which drivers, or others in the vehicle, interact with the navigation system vary widely from one system to another. Some navigation systems require the user to enter information, such as a destination address, via a touchscreen menu system or keyboard-style screen. These systems have the distinct disadvantage that they cannot be used safely by a driver while driving due to the high level of distraction they cause the driver—including a cognitive load on the driver, and the need for the driver to take his or her hands off the steering wheel and eyes off the road. Another disadvantage of these systems is the added cost due to the requirement of an interactive screen.

An alternative to manually entering data into a keypad or touchscreen is to use voice commands for providing inputs to the navigation system. The use of voice commands to control a vehicle navigation system, for example to designate a destination address, is desirable as discussed previously. However, a significant problem exists with respect to the accurate machine recognition of the spoken words. Speech recognition is particularly challenging in an automotive cockpit environment, due to the high level of background noise which is normally present. Some speech-recognition based navigation systems have attempted to overcome this difficulty by allowing the user to spell their destination street, city, and state names one letter at a time. This approach has the advantage that each sound spoken must only be matched with one of the 26 letters of the English alphabet, rather than checked against the many thousands of names in an address directory. Even these systems, however, have problems discerning the difference between letters which sound alike—such as A, J, and K. Such systems have typically resorted to asking the user to confirm each letter after it is spoken, which adds significant time and aggravation to the process. Furthermore, if these existing systems mistakenly identify even one letter during the spelling process, they are unlikely to be able to accurately match the desired destination name.

Given all of these difficulties with existing speech recognition techniques in navigation systems, a need was recognized for a system which has the advantages of letter by letter spelling, but is more robust in handling the ambiguity caused by letters which sound similar.

SUMMARY OF THE INVENTION

In accordance with the teachings of the present invention, a method and system are disclosed for improving the accuracy and reliability of speech recognition for navigation system destination entry. The method and system include the grouping of each letter of the alphabet into a phonetic letter family, or group of similar sounding letters. During navigation use, the user is instructed to spell their destination street, city, and state names letter by letter. As each letter is spoken, the system only needs to determine which phonetic letter family the letter belongs to, and progressively narrows the list of possible name matches accordingly. Using only the phonetic letter family representation of each letter, a system using this method can still identify the name which the user is spelling, often before the entire name has been spelled. This can be done with high reliability, and without asking for user confirmation of each letter.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for improving the reliability of speech recognition in a vehicle navigation system is merely exemplary in nature, and is in no way intended to limit the invention or its applications or uses.

The present invention proposes a method and system for improving the reliability of speech recognition in a vehicle navigation system by using phonetic letter families, or groups of similar sounding letters. Whereas other speech recognition navigation systems which allow spelled name input have difficulty with the inherently similar sound of different letters, the proposed method and system actually take advantage of this by grouping similar sounding letters together and considering all letters within one family or group to be equivalent for the purpose of matching a street, city, or state name in a database.

Figure 1:
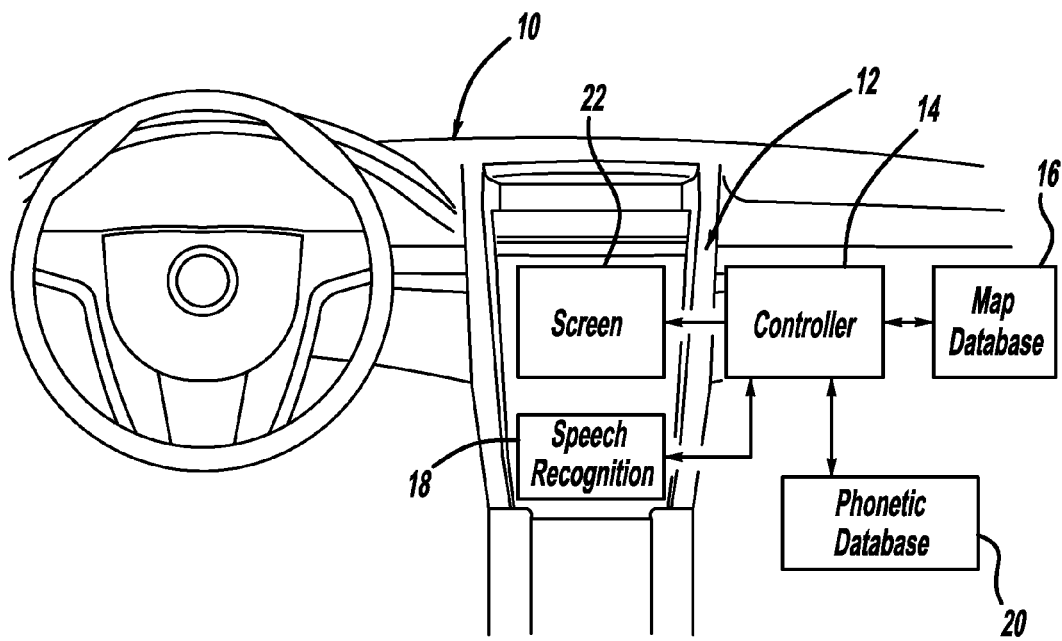
FIG. 1 is a plan view of a vehicle console including a navigation system.

FIG. 1 is a plan view of a vehicle console 10, including both the physical and logical elements of a navigation system 12 with speech recognition capability. The heart of the navigation system 12 is a controller 14 which handles all system inputs, outputs and calculations. In particular, the controller 14 interacts with a map database 16, which contains all of the address, street, city, and state information and relationships needed for navigation. The controller 14 also interacts with a speech recognition processor 18, which is a device specifically designed to recognize and process spoken input from a user. As described below, the speech recognition processor 18 is specially programmed to recognize spoken letters in terms of a phonetic letter family in which each letter belongs. The controller 14 also has access to a phonetic database 20, which is an alternate version of the map database 16. In the phonetic database 20, each street, city and state name is spelled with its phonetic equivalent, as will be explained in detail below. Finally, the navigation system 12 displays any graphical output, including real-time map graphics, on an optional screen 22.

The controller 14 and the speech recognition processor 18 are programmed such that the twenty-six letters of the English alphabet are grouped together into phonetic letter families, where all of the letters in each group or family sound similar when spoken. The same concept could be used to create phonetic letter families in other alphabets as well.

In one embodiment, there are ten groups of letters, defined as 1) AJK; 2) BCDEGPTVZ; 3) IY; 4) L; 5) HMN; 6) O) QU; 8) R; 9) FSX; and 10) W. These groupings were determined not by a person or persons intuitively deciding which letters sound similar, but rather by analyzing the output of various speech recognition systems to see which spoken letters were most often confused with which others. In the examples described below, each letter family is represented by the first letter in the family. For example—A, J, and K are all members of the A family; I and Y are members of the I family; and so forth. However, other implementations are possible where each letter family can be represented by any suitable code or value. What is important is that the speech recognition processor 18 can reliably assign each letter as it is spoken to the proper family.

During a typical use of the vehicle navigation system 12, a user would spell the name of their destination street, city, and/or state, by speaking each letter in the name. As each letter is spoken, the speech recognition processor 18 identifies the letter only by the phonetic letter family, not by the individual letter. For example, if the processor 18 hears a letter that ends with the "long A" sound, it knows that the user was saying A or J or K, and it assigns that letter to the A family. In other words, the processor 18 does not attempt to distinguish the specific spoken letter in the phonetic letter family, but only that the spoken letter was in that family. By not attempting to discern between a spoken A, J, or K, for example, the proposed method and system are much more tolerant of noise in the vehicle cockpit, distortion in the microphone circuit, and variations in pronunciation from person to person.

The user would speak the numbers and letters of a real address. The navigation system 12 would represent the real address as a phonetic equivalent address, where each letter of the real address as spoken is replaced by its phonetic letter family name as understood by the speech recognition processor 18, where the phonetic letter family name is the first letter of the family. Each element of the phonetic equivalent address, such as the street name, city name, and state name, can then be compared to a phonetic database 20, which is a navigation database in which all street, city, and state names have been converted to their phonetic letter family equivalent. As discussed in more detail below, by spelling the words with their phonetic equivalents, the specific combination of phonetic equivalents can be easily compared to a stored version of that combination which is converted to the actual spelling.

In one example, the user spells a desired destination address, one number or letter at a time, as follows, "30500 Mound Rd Warren Mich.". The system maps this into a phonetic equivalent of "30500 HOQHB RB WARRBH HIBHIBAH". First, the state sequence (HIBHIBAH) is matched against a phonetic equivalent list of all 50 US states, which uniquely produces "Michigan". Then "WARRBH" is matched against a list of the cities in Michigan, which uniquely results in "Warren". Finally "HOQHB RB" is matched against a list of the street names in Warren, which produces "Mound Rd". It is stressed that this is only an example of the process sequence used by the navigation system. Other navigation systems may employ a different sequence to identify the phonetic spelling of a word in the address within the scope of this invention. For example, the navigation database could also include the names of the businesses and residences at each address, and the user could spell the name of the business or residence instead of spelling the names of the street, city, and state.

Figure 2:
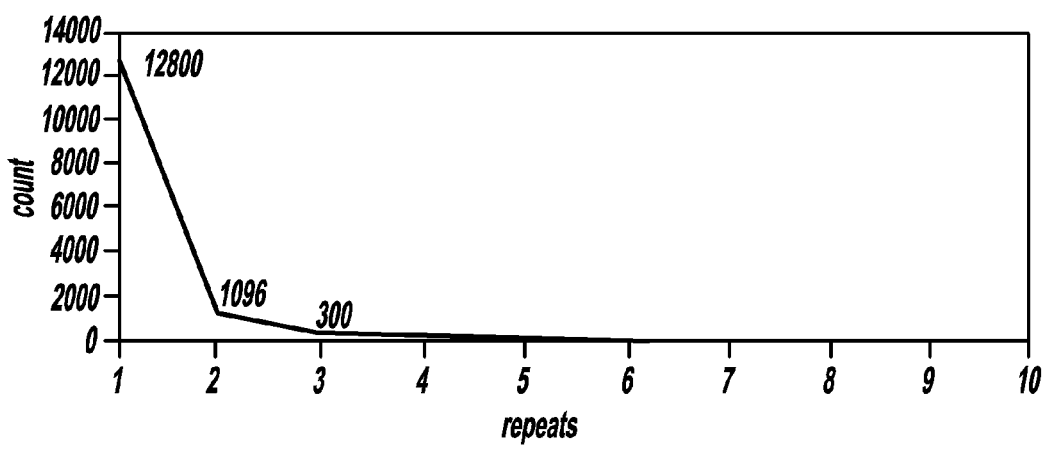
FIG. 2 is a graph showing how the range of possible matches to the spelling of a name narrows rapidly with each successive letter given, even when the letters are identified only by their phonetic letter family.

FIG. 2 is a graph showing how the list of possible names converges rapidly with each additional letter spoken by the user, even when each letter sensed by the system is represented as its phonetic letter family and matched against a phonetic database 20 in which each map database entry has been converted to its phonetic letter equivalent. The horizontal axis represents the number of letters in the name spoken by the user. The vertical axis represents the number of possible names in the navigation database which match the phonetic letter string. In this example, after the user has spoken only the first letter of the name, there are 12800 names in the database which may match the spelling of the name. After the second letter has been spoken, the number of possible name matches drops to 1096. Similarly, after the third letter has been spoken, the number of possible name matches drops to 300. It can be seen that the convergence is rapid, so that one or only a few names will match the spoken letter series when the spelling is completed. Analysis has shown that the system will reliably converge on the desired destination name in almost all cases. In those cases where the system does not converge to a single entry after the user has completely spelled the name of the desired destination, the system can present the short list of remaining possibilities to the user for selection.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for identifying a name stored in a computer system, said method comprising:
   defining a plurality of phonetic letter families representing the letters of an alphabet, where each phonetic letter family includes one or more letters which sound similar when spoken;
   providing a database of names which includes both an actual spelling of each name and a phonetic equivalent spelling of each name, where the phonetic equivalent spelling of each name is spelled using the phonetic letter family for each letter in the name;
   spelling a name that a user wants to identify in the database of names;
   converting each letter in the name spelled by the user to its phonetic letter family, to create a series of phonetic letters, by a speech recognition processor device;
   comparing the series of phonetic letters to the phonetic equivalent spelling of each name in the database, to create a list of possible matches, by a controller device;
   narrowing the list of possible matches as each additional letter is added to the series of phonetic letters, by the controller device; and
   presenting the list of possible matches to the user for confirmation when the user completes the spelling of the name.

2. The method according to claim 1 wherein the alphabet is the Roman alphabet.

3. The method according to claim 2 wherein the phonetic letter families include:
   a group consisting of the letters A, J, and K;
   a group consisting of the letters B, C, D, E, G, P, T, V, and Z;
   a group consisting of the letters I and Y;
   a group consisting of the letter L;
   a group consisting of the letters H, M, and N;

a group consisting of the letter O;
a group consisting of the letters Q and U;
a group consisting of the letter R;
a group consisting of the letters F, S, and X; and
a group consisting of the letter W.

4. The method according to claim 1 wherein:
the computer system is a vehicle navigation system;
the database of names is a navigation database of street addresses, cities, and states; and
the name spelled by the user is a destination address containing a street number, a street name, a city name, and a state name.

5. The method according to claim 4 wherein the destination address is resolved by:
comparing the state name as spelled by the user against a list of states in the United States to determine a matched state name;
using the matched state name to create a subset of possible city names from the navigation database, where the subset of possible city names includes all of the cities in the state designated by the matched state name;
comparing the city name as spelled by the user against the subset of possible city names to determine a matched city name;
using the matched city name to create a subset of possible street names from the navigation database, where the subset of possible street names includes all of the streets in the city designated by the matched city name;
comparing the street name as spelled by the user against the subset of possible street names to determine a matched street name;
reconstructing the destination address by appending the matched street name to the street number as spoken by the user, adding the matched city name, and adding the matched state name; and
presenting the destination address as reconstructed to the user for confirmation.

6. The method according to claim 1 wherein:
the computer system is a vehicle navigation and travel assistance system;
the database of names is a database of street addresses with city and state, including the name of the residence or business at each address; and
the name spelled by the user is a destination name comprising a name of a residence or business.

7. A system for identifying a name stored in a computer, said system comprising:
a data set containing a plurality of phonetic letter families representing the letters of an alphabet, where each phonetic letter family includes one or more letters which sound similar when spoken;
a database of names which includes both an actual spelling of each name and a phonetic equivalent spelling of each name, where the phonetic equivalent spelling of each name is spelled using the phonetic letter family for each letter in the name;
a speech recognition processor that accepts a spoken input from a user, said spoken input comprising a series of letters which spell a name which the user wants to find in the database of names;
means for converting each letter of the spoken input to its phonetic letter family to create a series of input phonetic letters;
means for storing the series of input phonetic letters;
means for comparing the series of input phonetic letters to the phonetic equivalent spelling of all names in the database to create a list of possible matches, and narrowing the list of possible matches as each additional letter is added to the series of input phonetic letters; and
an output device for presenting the list of possible matches to the user for confirmation when the user completes the spoken input.

8. The system according to claim 7 wherein the alphabet is the Roman alphabet.

9. The system according to claim 8 wherein the phonetic letter families include:
a group consisting of the letters A, J, and K;
a group consisting of the letters B, C, D, E, G, P, T, V, and Z;
a group consisting of the letters I and Y;
a group consisting of the letter L;
a group consisting of the letters H, M, and N;
a group consisting of the letter O;
a group consisting of the letters Q and U;
a group consisting of the letter R;
a group consisting of the letters F, S, and X; and
a group consisting of the letter W.

10. The system according to claim 7 wherein the computer is a vehicle navigation system.

11. The system according to claim 10 wherein the database of names is a navigation database of street addresses, cities, and states and the spoken input is a destination address containing a street number, a street name, a city name, and a state name.

12. The system according to claim 11 further comprising:
means for comparing the state name as spelled by the user against a list of states in the United States to determine a matched state name;
means for using the matched state name to create a subset of possible city names from the navigation database, where the subset of possible city names includes all of the cities in the state designated by the matched state name;
means for comparing the city name as spelled by the user against the subset of possible city names to determine a matched city name;
means for using the matched city name to create a subset of possible street names from the navigation database, where the subset of possible street names includes all of the streets in the city designated by the matched city name;
means for comparing the street name as spelled by the user against the subset of possible street names to determine a matched street name;
means for reconstructing the destination address by appending the matched street name to the street number as spoken by the user, adding the matched city name, and adding the matched state name; and
means for using the output device to present the destination address as reconstructed to the user for confirmation.

13. The system according to claim 7 wherein the computer is a vehicle navigation and travel assistance system, the database of names is a database of street addresses with city and state, including the name of the residence or business at each address, and the spoken input is a destination name comprising a name of a residence or business.

14. A vehicle navigation system comprising:
a data set containing a plurality of phonetic letter families representing the letters of an alphabet, where each phonetic letter family includes one or more letters which sound similar when spoken;
a navigation database of street addresses, street names, city names, and state names, which includes both an actual spelling of each name and a phonetic equivalent spelling of each name, where the phonetic equivalent spelling of each name is spelled using the phonetic letter family for each letter in the name;

a speech recognition processor that accept a spoken input from a user, said spoken input comprising a series of letters which spell a name which the user wants to find in the navigation database, and for converting each letter of the spoken input to its phonetic letter family to create a series of input phonetic letters;

a controller for storing the series of input phonetic letters, and for comparing the series of input phonetic letters to the phonetic equivalent spelling of all names in the database to create a list of possible matches, and narrowing the list of possible matches as each additional letter is added to the series of input phonetic letters; and a display screen for presenting the list of possible matches to the user for confirmation when the user completes the spoken input, and for graphically presenting navigation data to the user.

15. The vehicle navigation system according to claim 14 wherein the alphabet is the Roman alphabet.

16. The vehicle navigation system according to claim 14 wherein the phonetic letter families include:
- a group consisting of the letters A, J, and K;
- a group consisting of the letters B, C, D, E, G, P, T, V, and Z;
- a group consisting of the letters I and Y;
- a group consisting of the letter L;
- a group consisting of the letters H, M, and N;
- a group consisting of the letter O;
- a group consisting of the letters Q and U;
- a group consisting of the letter R;
- a group consisting of the letters F, S, and X; and
- a group consisting of the letter W.

\* \* \* \* \*